United States Patent [19]

Shen

[11] Patent Number: 5,267,712

[45] Date of Patent: Dec. 7, 1993

[54] ADJUSTABLE CAMERA STAND

[76] Inventor: Woei-Horng Shen, Room 602, 6F, No. 75, Roosevelt Road Section 2, Taipei, Taiwan

[21] Appl. No.: 634,699

[22] Filed: Dec. 27, 1990

[51] Int. Cl.$^5$ ............................................. F16M 11/12
[52] U.S. Cl. ................................... 248/179; 248/185; 248/188.7; 354/293; 354/81
[58] Field of Search .................... 248/178, 169, 188.7, 248/179, 185, 188; 354/293, 81

[56] References Cited

U.S. PATENT DOCUMENTS

| 824,479 | 6/1906 | Halvorsen | 248/179 |
|---|---|---|---|
| 1,889,260 | 11/1932 | Mitchell | 248/185 |
| 2,579,348 | 12/1951 | Taylor | 248/178 |
| 2,919,093 | 12/1959 | Mooney | 248/188 |
| 3,006,052 | 10/1961 | Stickney et al. | 354/293 X |
| 3,128,982 | 4/1964 | Christopher | 354/293 X |
| 3,738,287 | 6/1973 | Gusdorf et al. | 248/188 X |
| 4,579,436 | 4/1986 | Jaumann | 354/293 |
| 4,648,697 | 3/1987 | Kawazoe | 354/293 |
| 4,763,151 | 8/1988 | Klinger | 248/179 X |
| 5,119,203 | 6/1992 | Hosaka et al. | 354/81 X |

FOREIGN PATENT DOCUMENTS

| 1534354 | 9/1966 | France | 354/293 |
|---|---|---|---|
| 7506218 | 7/1976 | Netherlands | 248/169 |

Primary Examiner—David A. Scherbel
Assistant Examiner—Korie H. Chan
Attorney, Agent, or Firm—Morton J. Rosenberg; David I. Klein

[57] ABSTRACT

An adjustable camera stand comprising a camera mounting seat adjustably secured by a locking bolt to a seat holder at the top of an elongated support which is inserted in a tripod head at the top of a tripod and adjustably secured in position by a socket. The locking bolt has a plurality of raised strips around the rear end thereof to alternatively engage with the elongated grooves on the circular retainer portion of the seat holder and/or the elongated grooves on the circular blind hole at the connecting end of the camera mounting seat, so that the camera mounting seat can be adjusted to a desired angle. The socket can be rotated clockwise or counter-clockwise so that the elongated support can be adjusted to a desired level position.

1 Claim, 5 Drawing Sheets

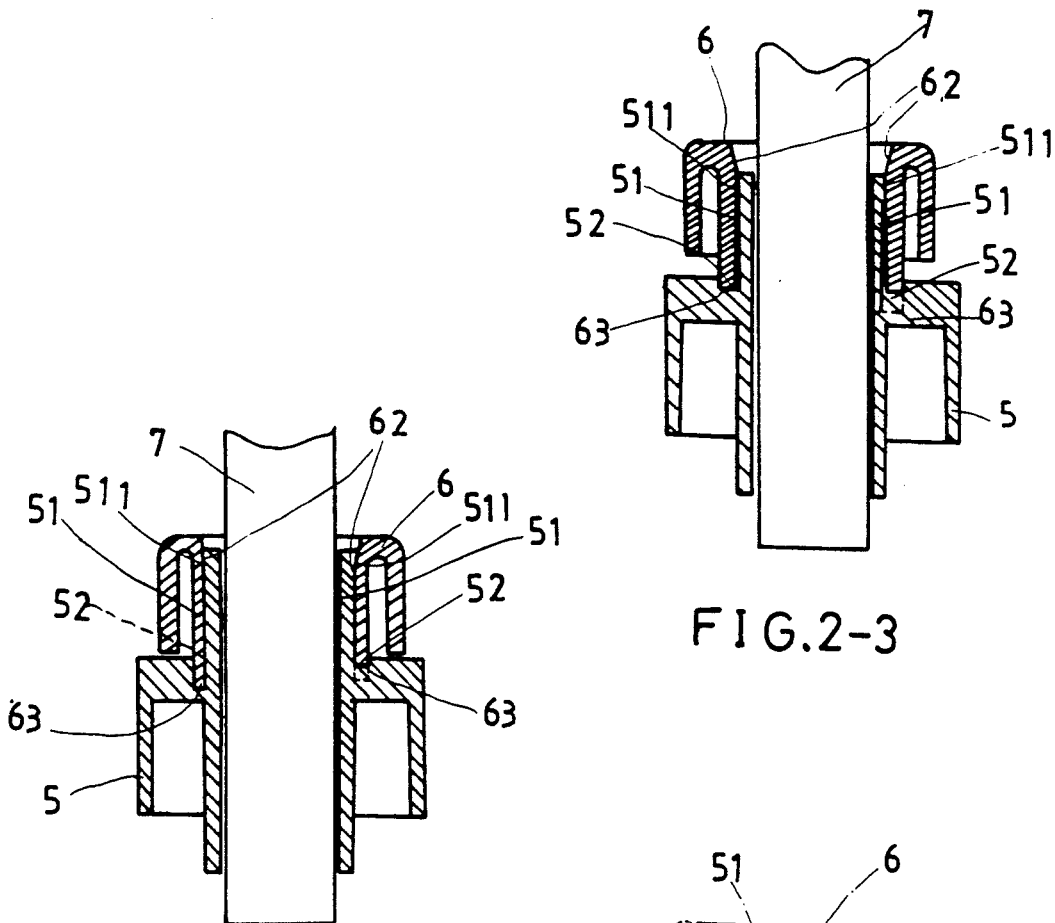
FIG.2-3
FIG.2-1
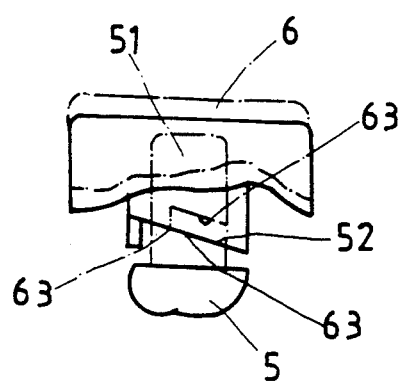
FIG.2-2

ADJUSTABLE CAMERA STAND

BACKGROUND OF THE INVENTION

The present invention relates to camera stands, and more particularly to a camera stand which comprises a camera mounting seat for holding a camera and adjustably secured by a locking bolt to a seat holder at the top of an elongated support which is inserted in a tripod head at the top of a tripod and adjustably secured in position by a socket.

Tripod is a three-legged support for a camera. Conventionally, a tripod generally comprises a socket for mounting a camera, which is mounted on a ball-and-socket joint at the top of the tripod head and adjustably secured in position by a set screw. The common disadvantage of this structure of camera stand is that the outer thread of the set screw and the inner thread of the ball-and-socket joint may be damaged easily to affect the positioning of the socket. Another disadvantage of this structure of camera stand is that the complicated structure is difficult and expensive to manufacture.

SUMMARY OF THE INVENTION

The present invention is to provide an adjustable camera stand which comprises a camera mounting seat for holding a camera and adjustably secured by a locking bolt to a seat holder at the top of an elongated support which is inserted in a tripod head at the top of a tripod and adjustably secured in position by a socket. The locking bolt has a plurality of raised strips around the rear end thereof to alternatively engage with the elongated grooves on the circular retainer portion of the seat holder and/or the elongated grooves on the circular blind hole at the connecting end of the camera mounting seat, so that the camera mounting seat can be adjusted to a desired angle. The socket has a plurality of sloping notches axially disposed at the bottom and set at the top edge of the oblique side blocks of the retainer plates which are fastened in the tripod head around a circle. The elongated support can be vertically moved to a desired position when the socket is rotated counterclockwise, and the elongated support can be firmly retained at a desired position when the socket is rotated clockwise.

BRIEF DESCRIPTION OF THE DRAWINGS

The present invention will now be described by way of example only, with reference to the annexed drawings, in which:

FIGS. 1-1 and 1-2 illustrates the alternative positioning of the locking bolt in securing the camera mounting seat to the seat holder or in an adjusting position permitting the camera mounting seat to be rotated relative to the seat holder;

FIG. 2 is a perspective dismantled and partly sectional view of the tripod head and the socket of the preferred embodiment of the adjustable camera stand of the present invention;

FIGS. 2-1 and 2-3 are sectional drawings illustrating the relative positioning of the socket on the tripod head;

FIG. 2-2 is a schematic detailed view illustrating the relative positioning of the sloping notches in the side blocks of the retainer plates of the tripod head; and FIG. 3 illustrates the preferred embodiment of the adjustable camera stand of the present invention.

DETAILED DESCRIPTION OF THE PREFERRED EMBODIMENT

Figure 1:
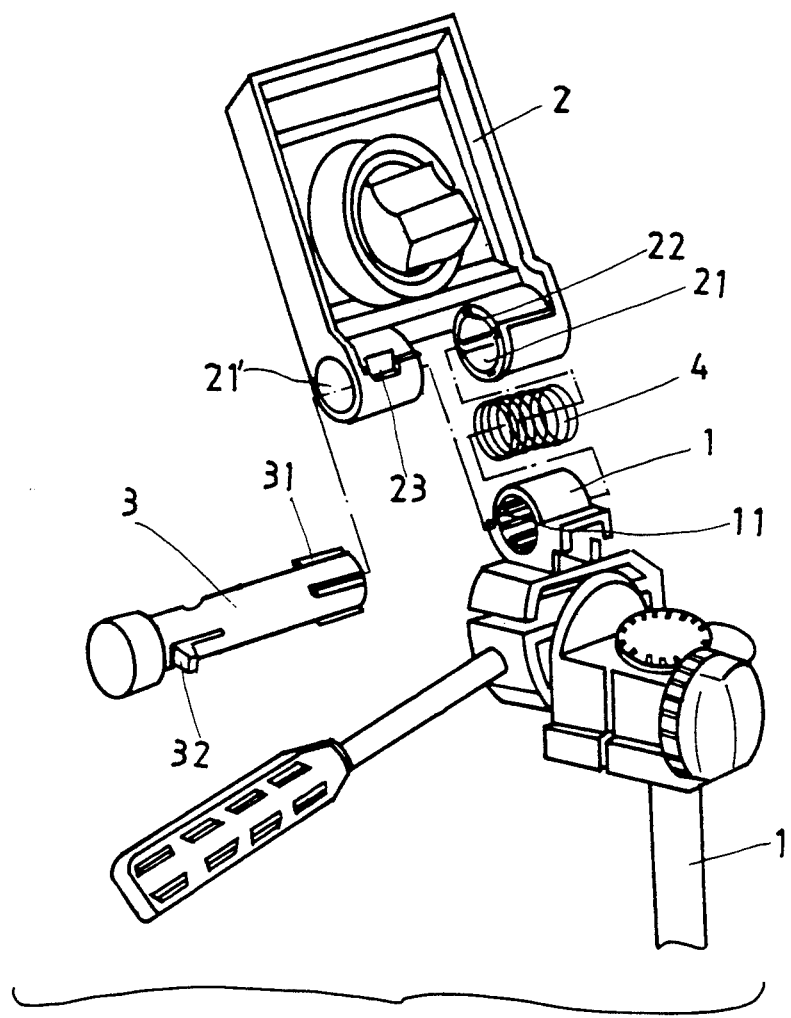
FIG. 1 is a perspective dismantled view of the camera mounting seat, the locking bolt and the seat holder of the preferred embodiment of the adjustable camera stand of the present invention.
Figure 3:
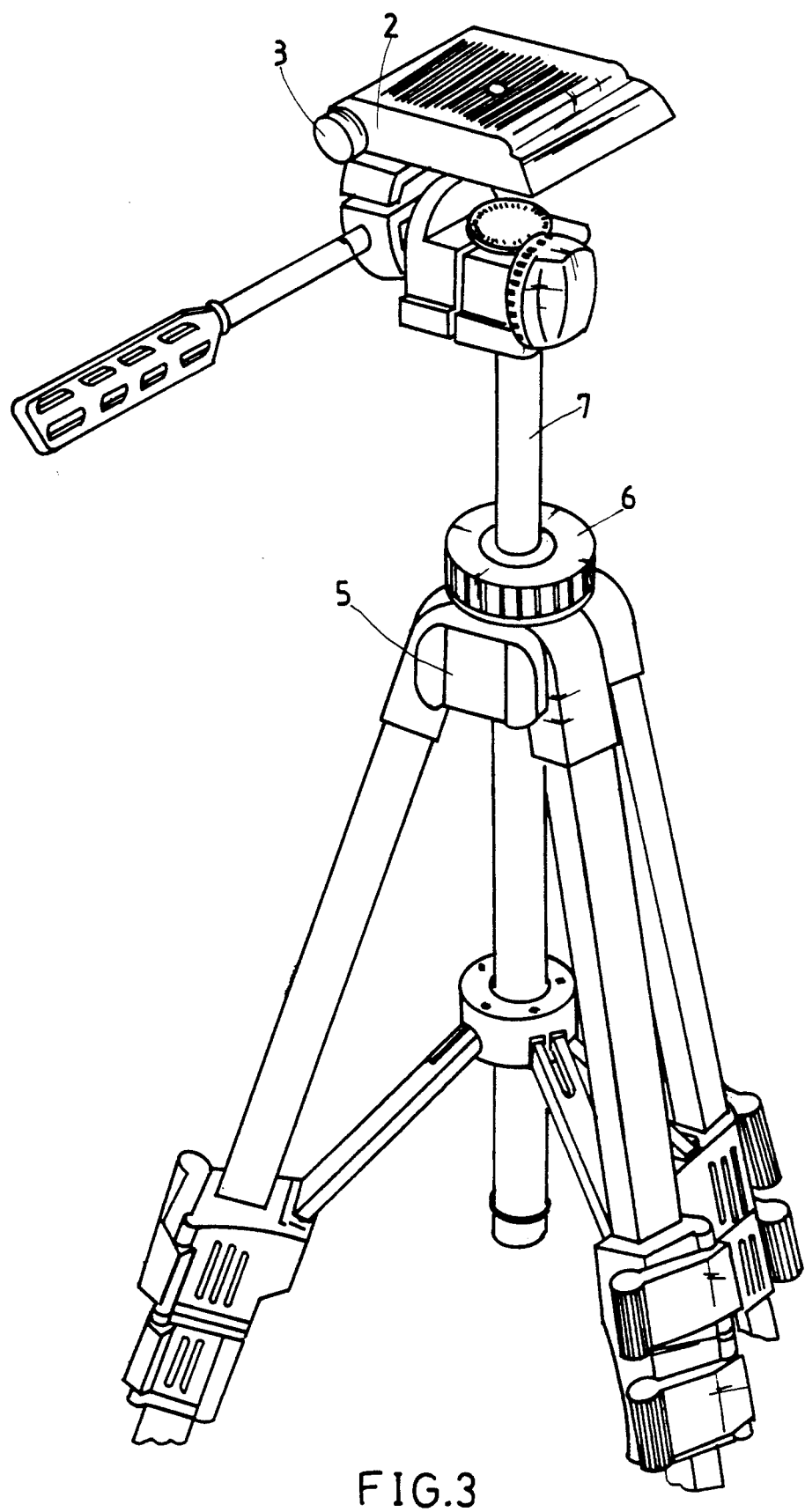

Referring to FIGS. 1 and 1-1, a camera mounting seat 2 is secured to a seat holder 1 at the top of a support 7, which is fastened in a tripod head 5 of a tripod (see FIG. 3), by a locking bolt 3. The camera mounting seat 2 is provided for holding a camera, having two circular mounting holes 21 and 21' bilaterally disposed at one end for fastening the locking bolt 3, wherein the circular mounting hole 21 has a plurality of elongated grooves 22 equidistantly made on the inner wall surface thereof, and the circular mounting hole 21' has a retaining slot 23 made thereon at a suitable location. The seat holder 1 has a plurality of elongated grooves 11 on the inner wall surface of the circular retainer portion thereof. The locking bolt 3 has a plurality of raised strips 31 at one end around the periphery thereof, and a resilient locking block 32 at a suitable location. Before the camera mounting seat 2 is attached to the seat holder 1, a spring coil 4 is set inside the circular mounting hole 21. After the spring coil 4 is set in the circular mounting hole 21, the camera mounting seat 2 is attached to the seat holder 1 with the circular retainer portion of the seat holder 1 set between the two circular mounting holes 21 and 21' permitting the elongated grooves 11 of the seat holder 1 to respectively longitudinally aligned with the elongated grooves 22 of the circular mounting hole 21. Then, the locking bolt 3 is inserted through the circular mounting hole 21', the circular retainer portion of the seat holder 1 and the circular mounting hole 21 with the raised strips 31 respectively engaged with the elongated grooves 11 and 21, and with the locking block 32 locked in the retaining slot 23. Thus, the camera mounting seat 2 becomes firmly secured to the seat holder 1 by the locking bolt 3. By means of the spring force of the spring coil 4, the raised strips 31 of the locking bolt 3 are forced to respectively engage with the elongated grooves 11 and 22, and therefore, the camera mounting seat 2 is protected from rotating against the seat holder 1. When the locking bolt is further pushed inwards, the raised strips 31 are moved away from the elongated grooves of the seat holder 1 to become fully engaged with the elongated grooves 22 of the circular mounting hole 21, and therefore, the camera mounting seat 1 can be rotated through a certain angle relative to the seat holder 1. As soon as pressing force is released from the locking bolt 3, the locking bolt 3 is immediately forced by the spring coil 4 to displace backwards permitting the raised strips 31 to respectively engage with the elongated grooves 11 of the seat holder 1 and the elongated grooves 22 of the circular mounting hole 21. Thus, the camera mounting seat 2 becomes firmly retained at an adjusted position.

Figures 1, 2:
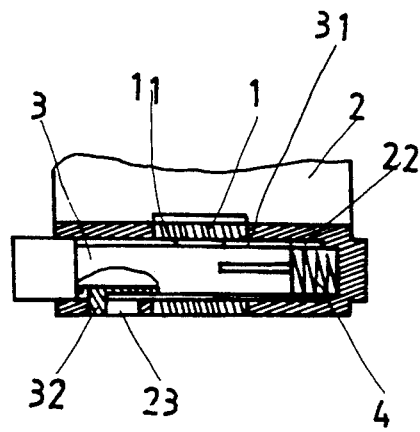
Figure 1:
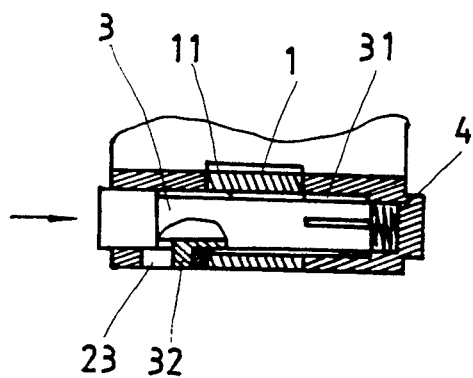
Figure 2:
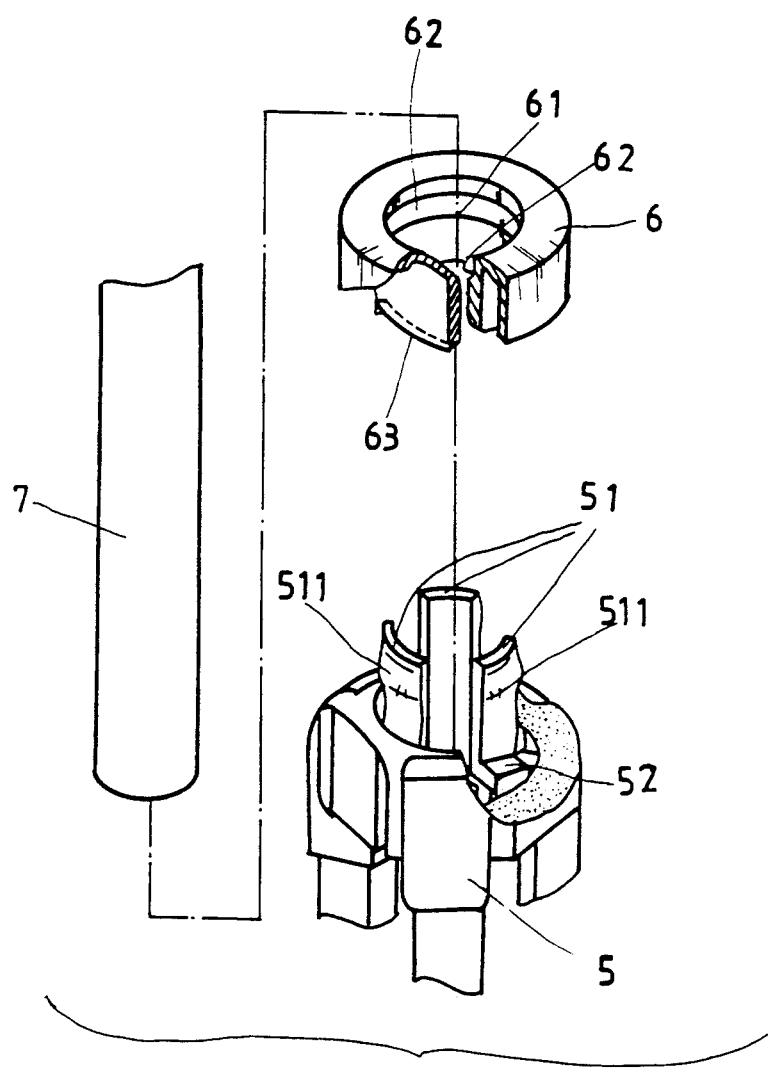

Referring to FIGS. 2, 2-1 and 2-2, the tripod head 5 has a plurality of retainer plates 51 equidistantly vertically set therein around a circle, which retainer plates 51 define therein a round hole for mounting the support 7 which supports the seat holder 1 for holding the camera seat 2. The retainer plates 51 have each a sloping surface portion 511 at the outer top end thereof, and a unitary side block 52 obliquely disposed at a lower position. There is provided a socket 6 mounted on the retainer plates 51 of the tripod head 5, which has a center hole 61, a tapered surface portion 62 on said center hole 61, and a plurality of sloping notches 63 at the bottom edge thereof, wherein the sloping notches 63 are designed in quantity and locations corresponding to the side blocks 52 of the retainer plates 51, and the sloping direction of the sloping notches 63 is disposed axially. When the socket 6 is rotated on the retainer plates 51, the sloping notches 63 are respectively moved to slide on the side blocks 52 of the retainer plates 51, causing the socket 6 to displace upwards. At the same time, the tapered surface portion 62 of the socket 6 are also moved upwards to squeeze the sloping surface portions 511 of the retainer plates 51 so as to firmly retain the support 7 therein. When the socket 6 is rotated in reverse direction, the squeezing force onto the retainer plates 51 is gradually reduced, so that the position of the support 7 can be adjusted to a desired height.

What is claimed is:

1. A camera stand, comprising a camera mounting seat adjustably secured by a locking bolt to a seat holder at the top of an elongated support which is inserted in a tripod head at the top of a tripod and adjustably secured in position by a socket, characterized in that:

a circular through-hole and a circular blind hole longitudinally aligned and bilaterally disposed at one end of said camera mounting seat and, a retaining slot at said one end vertically disposed in communication with said circular through-hole, said circular blind hole bounded by an inner wall surface, a plurality of elongated grooves longitudinally disposed on the inner wall surface of said circular blind hole, and a spring means set inside said circular blind hole;

a circular retainer portion on said seat holder set in between said circular through-hole and said circular blind hole, said circular retainer portion having an elongated hole which is bounded by an inner wall surface, said circular retainer portion having a plurality of elongated grooves on the inner wall surface and longitudinally respectively aligned with the elongated grooves on said circular blind hole;

a plurality of raised strips at one end around the periphery of said locking bolt, thereof said strips are alternatively disposed to engage with said elongated grooves of said circular retainer portion and said circular blind hole, and a resilient locking block one the locking bolt which is locked in said retaining slot for locking the camera mounting seat to said seat holder;

a plurality of retainer plates equidistantly vertically set therein around a periphery at the top of said tripod head and defining therein a round hole for mounting said elongated support, said retainer plates having each a sloping surface portion at the outer top end thereof and a unitary side block obliquely disposed at a lower end of said retainer plates; and a center hole defined in said socket, a tapered surface portion on said center hole, and a plurality of sloping notches axially disposed at a bottom edge of said socket for complimentary engagement with the side block of said retainer plates.

* * * * *